(12) United States Patent
Fajardo Sola

(10) Patent No.: US 7,531,476 B2
(45) Date of Patent: May 12, 2009

(54) REFRACTORY MATERIAL FOR CEMENT INDUSTRY KILNS AND USE THEREOF

(76) Inventor: Pedro Fajardo Sola, C/Poniente Poligono Industrial Poyo de Reva, 6-1A bajo, 46190 Ribarroja del Turia (Valencia) (ES)

( * ) Notice: Subject to any disclaimer, the term of this patent is extended or adjusted under 35 U.S.C. 154(b) by 117 days.

(21) Appl. No.: 11/687,011

(22) Filed: Mar. 16, 2007

(65) Prior Publication Data

US 2007/0167308 A1    Jul. 19, 2007

Related U.S. Application Data

(63) Continuation-in-part of application No. 10/470,527, filed on Dec. 22, 2003, now abandoned.

(30) Foreign Application Priority Data

Jan. 26, 2001    (WO) .................... PCT/ES01/00017

(51) Int. Cl.
*C04B 35/567*    (2006.01)
(52) U.S. Cl. ........................ 501/89; 501/130
(58) Field of Classification Search ............... 501/89, 501/130
See application file for complete search history.

(56) References Cited

U.S. PATENT DOCUMENTS 4,612,240 A    9/1986    Johnson et al.
5,030,595 A *  7/1991    Albon et al. ............... 501/89
5,382,555 A    1/1995    Stein et al.

FOREIGN PATENT DOCUMENTS

| DE | 3419199 A1 | 12/1985 |
| ES | 8607892 A | 6/1986 |
| FR | 2564825 A | 11/1985 |
| GB | 2159144 A | 11/1985 |
| GB | 2202220 A | 9/1988 |
| JP | 2000-203954 * | 7/2000 |
| WO | WO 98/55424 A | 12/1988 |

OTHER PUBLICATIONS

PCT International Search Report for Pedro Fajardo Sola, Int'l Application No. PCT/ES01/00017, Filed Jan. 26, 2001, Dated Mar. 26, 2001.

* cited by examiner

*Primary Examiner*—Karl E Group
(74) *Attorney, Agent, or Firm*—GrayRobinson, PA

(57) ABSTRACT

The present invention provides refractory materials for the kilns in the cement industry. The refractory material comprises andalusite, silicon carbide, and clay, or kaolinite, silicon carbide, and clay. The refractory materials can be configured as bricks such as fired refractory firebricks or formless configurations such as mortar. The material can be applied to the inside of the kilns to counteract thermal and physical/chemical deformation that occurs inside the kilns.

12 Claims, 4 Drawing Sheets

REFRACTORY MATERIAL FOR CEMENT INDUSTRY KILNS AND USE THEREOF

CROSS-REFERENCE TO RELATED APPLICATIONS

This is a continuation-in-part application of U.S. application Ser. No. 10/470,527, filed Dec. 22, 2003, now abandoned, which claims priority of International Application No. PCT/ES01/00017. The entire contents and disclosures of the preceding applications are incorporated by reference into this application.

Throughout this application, various references or publications are cited. Disclosures of these references or publications in their entireties are hereby incorporated by reference into this application in order to more fully describe the state of the art to which this invention pertains.

FIELD OF THE INVENTION

This invention provides a refractory material (e.g. a fired refractory firebrick) useful for lining the inside of cement industry kilns.

BACKGROUND OF THE INVENTION

The interior of kilns used to manufacture cement is lined with refractory materials that can withstand high working temperatures, which can reach around 1500 degrees Celsius in some areas, and the resulting physical and chemical reactions. Various refractory materials can be used but they all present drawbacks operationally and functionally, particularly with regard to progressive deformation by high kiln temperatures, spalling and cracking.

Known refractory materials currently in use are made up of glass-manufacture crucibles, lime, silica, chromium, magnetite, aluminum oxide and aluminous silica glass (Norton, Refractarios, first Spanish edition published by Blume in 1972). Japanese Patent no. JP11230679 describes variations in the porosity of refractory bricks, whereas JP 11130485 describes refractory materials as prefabricated panels, JP11201649 describes refractory materials with glass textures, European Patent no. EP0911594 teaches the arrangement of refractory materials, whereas German Patent DE19729582 discloses prefabricated bricks. In general, the above inventions are designed for the steel industry, and the resulting chemical composition or form are either not applicable to the peculiarities of the cement industry or are not detailed and sufficiently established.

U.S. Pat. No. 5,030,595 describes a carbon bake refractories of an unfired brick, which is useful for aluminum metal production. The silicon carbide content is limited to a maximum of 20% by weight, and high proportions of clays, alumina aggregates, and carbon are added. This unfired brick would be particularly unsuitable for cement kilns. In cement kilns it is necessary to use a greater amount of silicon carbide to avoid the carbon component.

Therefore, different compositions or bricks of refractory materials have different degrees of hardness and resistance to the deformation caused by differences in kiln temperature in different parts of the same kiln. Consequently, there is a need to find a refractory material of greater hardness and resistance than the materials currently employed. In the present invention this technical problem is solved and the resulting material described herein is suitable for uses in cement kilns.

SUMMARY OF THE INVENTION

The present invention provides a composition of refractory material comprising 55% by weight of andalusite, 35% by weight of silicon carbide, and 10% by weight of clay. Such composition is resistant to thermal, physical or chemical deformation. In one embodiment, the refractory material can be configured as bricks such as fired refractory firebricks or mortar. The present invention also provides a method of using the above composition to cover the inside of a cement-producing kiln. In one embodiment, the above-described refractory materials are configured as bricks. Such bricks can be used to cover the calcination area, the safety area, the transition area, the kiln outlet, or the coolers of cement-producing kiln.

In another embodiment, the present invention provides a composition of refractory material comprising 55% by weight of kaolinite, 35% by weight of silicon carbide, and 10% by weight of clay. Such composition is resistant to thermal, physical or chemical deformation. In one embodiment, such refractory material can be configured as bricks such as fired refractory firebricks or mortar. The present invention also provides a method of using the above composition to cover the inside of a cement-producing kiln. In one embodiment, the above-described refractory materials are configured as bricks. Such bricks can be used to cover the calcination area, the safety area, the transition area, the kiln outlet, or the coolers of cement-producing kiln.

The present invention also provides a composition of refractory material comprising at least 25% by weight of silicon carbide, between 35% to 70% by weight of andalusite ($Al_2SiO_5$), and between 5% to 10% by weight of clay, wherein the combination of these percentages adds up to a total of 100%. Such composition is resistant to thermal, physical or chemical deformation. In one embodiment, such refractory material can be configured as bricks such as fired refractory firebricks or mortar. The present invention also provides a method of using the above composition to cover the inside of a cement-producing kiln. In one embodiment, the above-described refractory materials are configured as bricks. Such bricks can be used to cover the calcination area, the safety area, the transition area, the kiln outlet, or the coolers of cement-producing kiln.

DETAILED DESCRIPTION OF THE INVENTION

Figure 1:
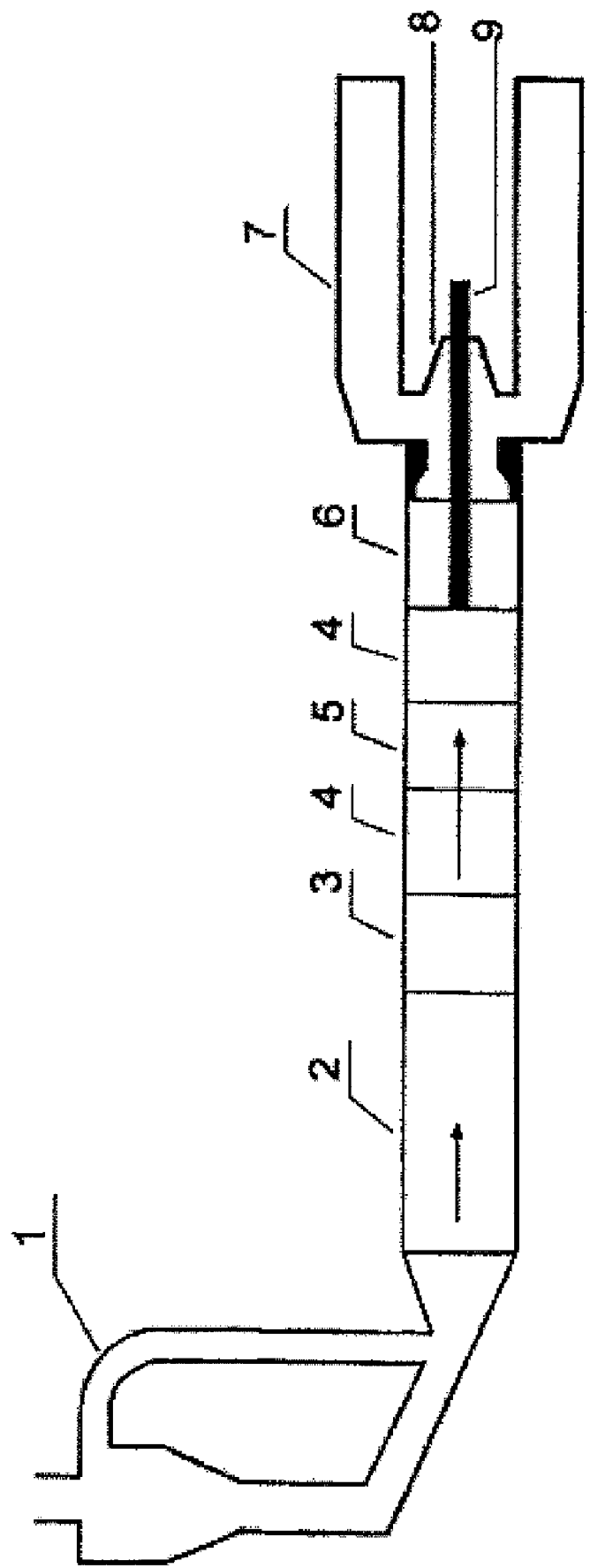
FIG. 1 shows an outline drawing of a rotary kiln with satellite coolers for the cement industry, in a configuration comprising a heat exchanger (1), a calcination area (2), a safety area (3), a transition area (4), a sintering area (5), an outlet area (6), coolers (7), a kiln head (8) and a flame burner (9).
Figure 2:
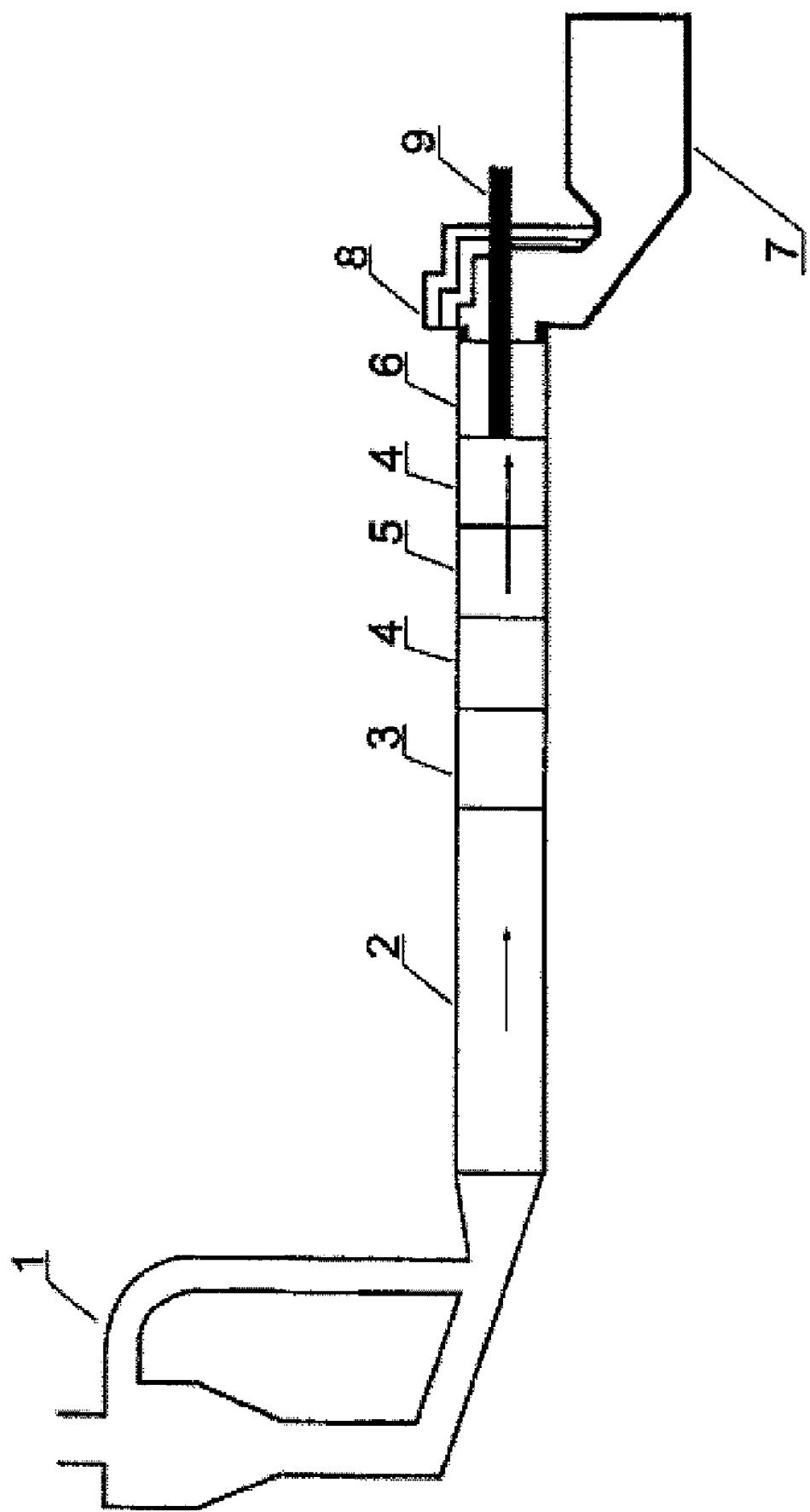
FIG. 2 shows an outline drawing of a rotary kiln with grate coolers for the cement industry, in a configuration comprising a heat exchanger (1), a calcination area (2), a safety area (3), a transition area (4), a sintering area (5), an outlet area (6), coolers (7), a kiln head (8) and a flame burner (9).

The present invention provides a composition comprising a neo-silicate such as andalucite, a crystalline solid such as silicon carbide (Sic) and a hydroaluminosilicate pelitic rock such as clay. The present composition can be configured as bricks or mortar. This material surpasses the limitations of the above-mentioned refractory materials with increased operational capacity and performance when it is applied in the kilns of the cement industry.

Andalusite is a common regional metamorphic mineral first reported from Andalucia, Spain in 1789. One of ordinary skill in the art would readily recognize andalucite as an aluminum nesosilicate mineral with the chemical formula $Al_2SiO_5$. Andalusite was chosen for the present invention for its low porosity, low thermal conductivity and refractory capacity. Silicon carbide (Sic) was chosen for its high refractory capacity and resistance to oxidation and abrasion, whereas clay was chosen for the present invention for its plasticity.

The composition or bricks of the present invention has the technical advantage of greater hardness and greater resistance to deformation caused by the heat inside cement-producing kilns and the physical and chemical reactions that occur within the kilns. This leads to considerable cost advantages as using the present composition would reduce the number of kiln stoppage cycles for maintenance and replacement of worn material.

It is not obvious to those skilled in the art that silicon carbide (SiC) can be used in amounts higher than those published previously. This is due to a serious technical limitation that in spite of a very high wear resistance, SiC has a high thermical conductivity that could damage the metal part of the cement kilns. Paradoxically, however, the present invention describes a high percentage (e.g. 35%) of SiC can be combined with Andalusite and clay to achieves a refractory material having high and powerful wear resistance (constant thickness). Even though initial conductivity of the material disclosed herein is higher than other refractory materials, the resulting real conductivity is smaller because other materials have a bigger wear that progressively leads to bigger conductivity (decreasing thickness).

In one embodiment of the present invention, the composition described herein can be applied to the most widely and frequently used rotary type kilns in the cement industry. It can be applied to various areas within the kiln, including but are not limited to, the calcination area (2), the safety area (3), the transition area (4), the kiln outlet (6) and the coolers (7). The composition of the present invention can also be applied in various configurations, including but are not limited to, bricks such as fired refractory firebricks and formless configurations such as mortar.

In one embodiment, the composition of the present invention is made up of 55% by weight of andalucite, 35% by weight of silicon carbide, and 10% by weight of clay. In another embodiment, the present invention provides a fired firebrick for cement kilns comprising at least by weight 25% of silicon carbide, between 35% and 70% by weight of andalusite $Al_2SiO_5$, and between 5% and 10% by weight of clay, with the combinations of these percentages adding up to a total of 100%.

A layered silicate mineral, kaolinite, can be used instead of andalucite. Kaolinite is a soft, earthy, usually white mineral produced by the chemical weathering of aluminum silicate minerals. One of ordinary skill in the art would readily recognize kaolinite as a clay mineral with the chemical formula $Al_2Si_2O_5(OH)_4$. Thus, in one embodiment, the composition of the present invention is made up of 55% by weight of kaolinite, 35% by weight of silicon carbide, and 10% by weight of clay.

Figure 3:
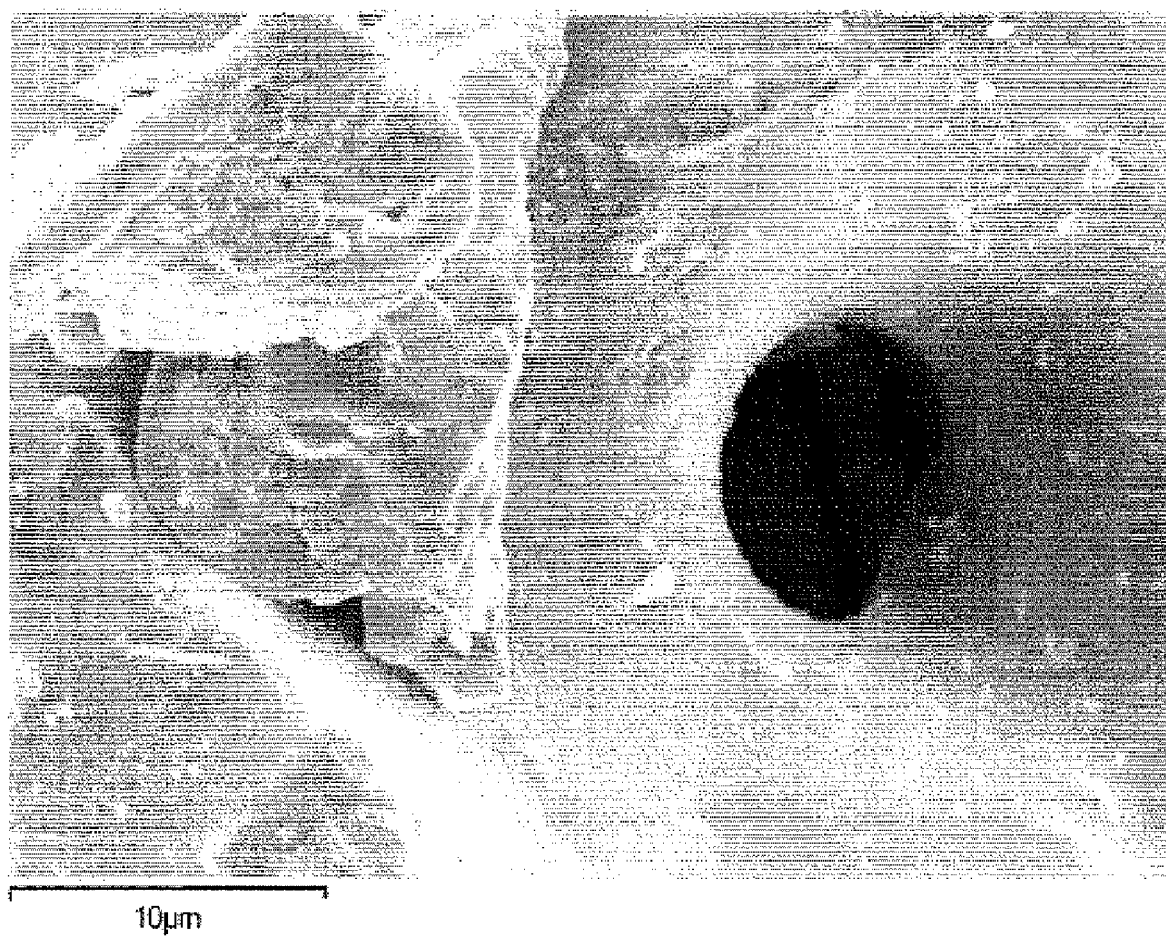
FIG. 3 shows a matrix microanalysis of a fired sample of the present invention analyzed by an electronic scanner microscope with an X-ray dispersive energy probe.
Figure 4:
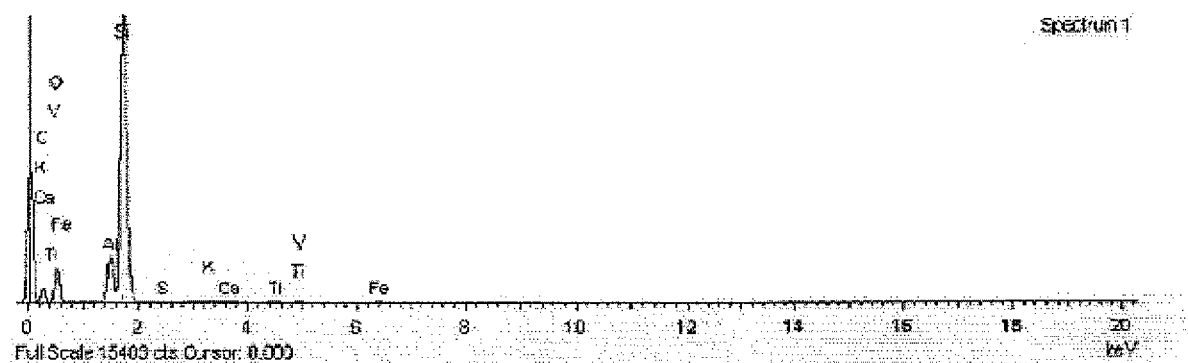
FIG. 4 shows an X-ray matrix spectrum of a fired sample of the present invention.

The refractory material of the present invention perfectly creates a continuous matrix that is consistent with reinforcement particles. The integration conditions of silicon carbide and andalusite are excellent, as can be seen from the well synthesized structure morphology and the few properly evolved pores (FIG. 3). These conclusions have been confirmed by the results of X-ray diffraction. In fact, fired sample of the present invention displays a classic diffraction spectrum of fired clays with a high content of aluminum oxide (FIG. 4). This kind of matrices integrates silicon carbide and andalusite particles very well.

What is claimed is:

1. A composition of refractory material comprising 55% by weight of andalusite, 35% by weight of silicon carbide, and 10% by weight of clay.

2. The composition of claim 1, wherein the composition is resistant to thermal, physical or chemical deformation.

3. The composition of claim 1, wherein the refractory material is configured as bricks or mortar.

4. The composition of claim 3, wherein the bricks are fired refractory firebricks.

5. A method of lining the inside of a cement-producing kiln, comprising the step of covering the inside of said kiln with the composition of claim 1.

6. The method of claim 5, wherein the composition covers an area of a kiln selected from the group consisting of calcination area, safety area, transition area, kiln outlet, and coolers.

7. A composition of refractory material comprising at least 25% by weight of silicon carbide, between 35% to 70% by weight of andalusite ($Al_2SiO_5$), and between 5% to 10% by weight of clay, wherein the combination of these percentages adds up to a total of 100%.

8. The composition of claim 7, wherein the composition is resistant to thermal, physical or chemical deformation.

9. The composition of claim 7, wherein the refractory material is configured as bricks or mortar.

10. The composition of claim 9, wherein the bricks are fired refractory firebricks.

11. A method of lining the inside of a cement-producing kiln, comprising the step of covering the inside of said kiln with the composition of claim 7.

12. The method of claim 11, wherein the composition covers an area of a kiln selected from the group consisting of calcination area, safety area, transition area, kiln outlet, and coolers.

* * * * *